United States Patent [19]

Kanomata et al.

[11] Patent Number: 5,423,578
[45] Date of Patent: Jun. 13, 1995

[54] COUPLING FOR CORRUGATED PIPE

[75] Inventors: Shinichi Kanomata; Morio Saito; Toshio Saito; Tetsuya Wada; Keizou Ohkawa; Yasushi Kosugi, all of Tokyo, Japan

[73] Assignee: Tokyo Gas Co., Ltd., Tokyo, Japan

[21] Appl. No.: 117,320

[22] Filed: Sep. 7, 1993

[30] Foreign Application Priority Data

| Mar. 8, 1993 | [JP] | Japan | 5-072898 |
| Mar. 8, 1993 | [JP] | Japan | 5-072899 |
| Mar. 8, 1993 | [JP] | Japan | 5-072900 |

[51] Int. Cl.⁶ .................................. F16L 37/18
[52] U.S. Cl. .................................. 285/315; 285/318; 285/321; 285/903
[58] Field of Search .............. 285/318, 315, 317, 321, 285/903

[56] References Cited

U.S. PATENT DOCUMENTS

| 2,226,826 | 12/1940 | Miller | 285/321 X |
| 3,532,101 | 10/1970 | Snyder | 285/318 X |
| 4,376,525 | 3/1983 | Frémy | 285/321 X |
| 4,907,830 | 3/1990 | Sasa et al. | 285/903 X |
| 5,080,405 | 1/1992 | Sasa et al. | 285/318 X |
| 5,261,707 | 11/1993 | Kotake et al. | 285/903 X |

FOREIGN PATENT DOCUMENTS

| 683011 | 3/1964 | Canada | 285/318 |
| 3023376 | 1/1982 | Germany | 285/317 |
| 352493 | 9/1989 | Japan . | |
| 391592 | 12/1989 | Japan . | |
| 677996 | 8/1952 | United Kingdom | 285/315 |

Primary Examiner—Randolph A. Reese
Assistant Examiner—Heather Chun Shackelford
Attorney, Agent, or Firm—Evenson, McKeown, Edwards & Lenahan

[57] ABSTRACT

A coupling for a corrugated pipe having ridges and grooves arranged alternately is disclosed. A body of this coupling has a through-hole whose one end is served as an inlet port. An annular accommodation recess and an annular retainer portion are formed on an inner periphery of the through-hole in this order toward the inlet port. A cylindrical support member is accommodated within the body. The support member is urged toward the inlet port by a spring. One end portion of the support member on the inlet port side is served as a receiving portion. An annular engagement member is mounted on an outer periphery of this receiving portion in such a manner as to be elastically enlarged in diameter. When the support member is pushed in a direction away from the inlet port against the spring by a distal end of the corrugated pipe inserted from the inlet port, the engagement member is disengaged from the receiving portion of the support member and reduced in diameter so as to be brought into engagement with an outer periphery of one of the grooves of the corrugated pipe. That part of the corrugated pipe, which projects from outer peripheries of the ridges of the corrugated pipe is retained by the retainer portion of the body while the engagement member is in engagement with the outer peripheries of the grooves.

20 Claims, 11 Drawing Sheets

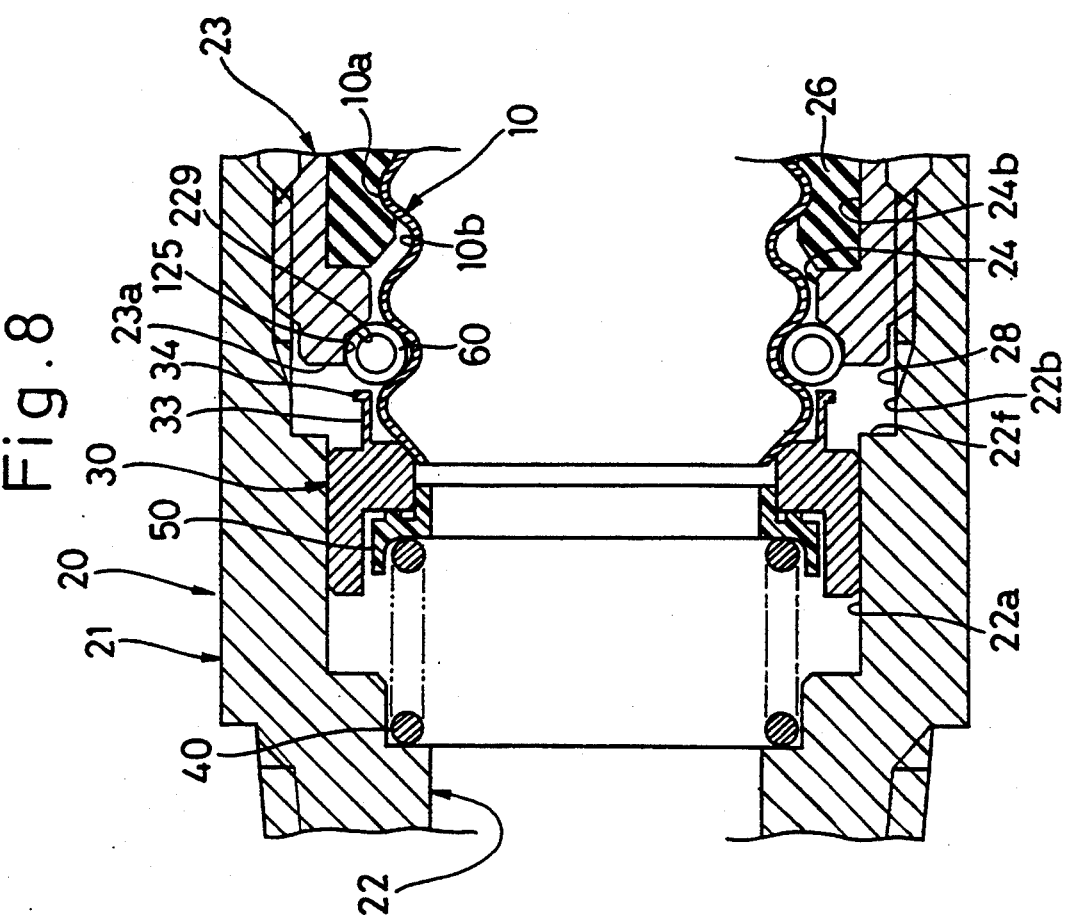
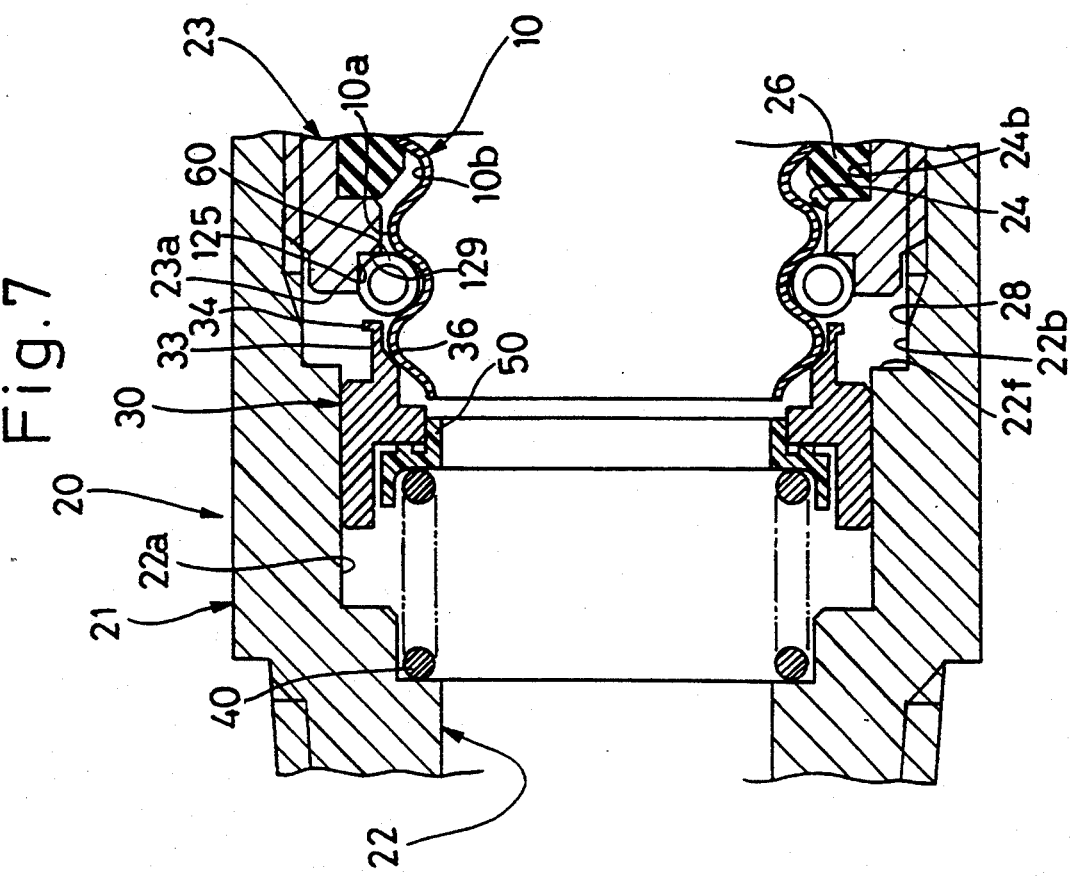

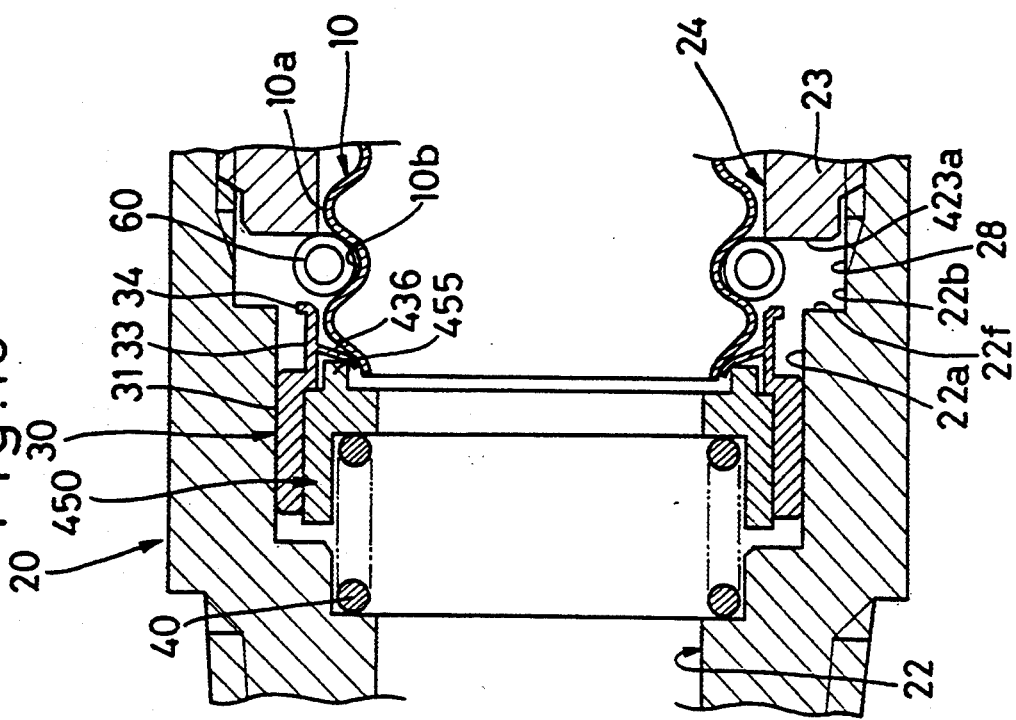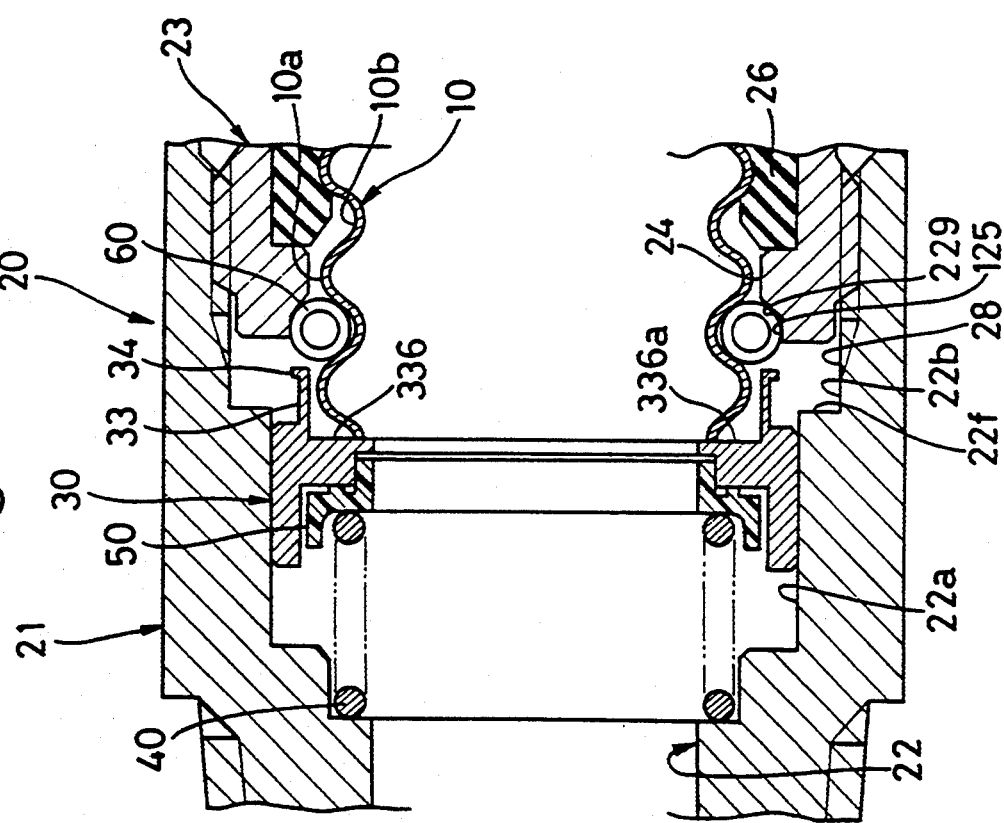

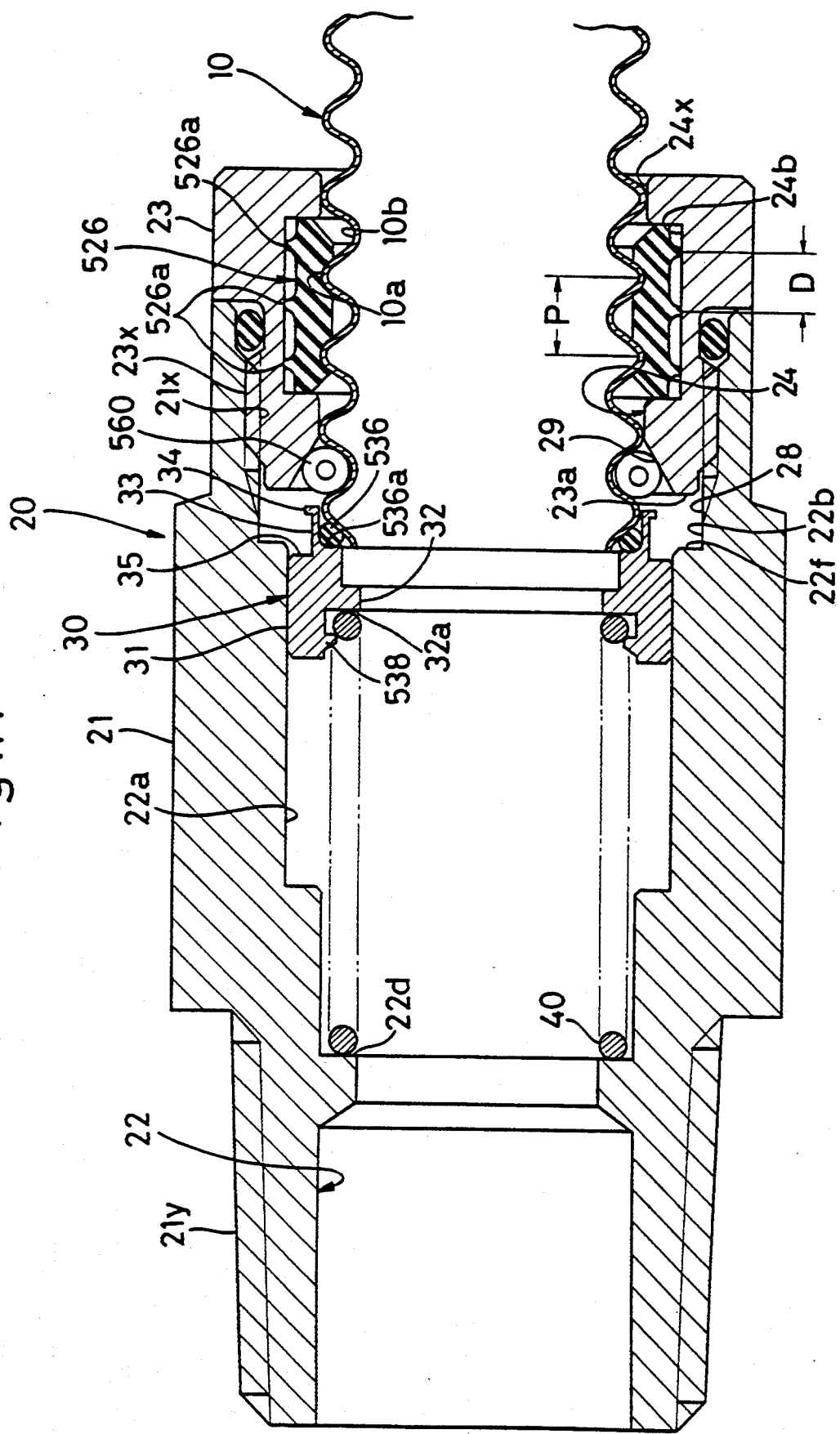

COUPLING FOR CORRUGATED PIPE

BACKGROUND OF THE INVENTION

This invention relates to a coupling capable of easily connecting a corrugated pipe which is often used as a pipe for supplying domestic gas or the like.

Japanese Laid-Open Utility Model Application No. Hei 3-52493 discloses a coupling capable of easily connecting a corrugated pipe through simple insertion. Specifically, a body of this coupling has a through-hole whose one end is served as an inlet port. A first and a second annular accommodation recesses are formed, in this order, in the through-hole in a manner axially spacedly away from the inlet port. An engagement member, which is formed of a coil spring whose both ends are connected together so that the coil spring forms an annular shape, is accommodated in the first accommodation recess, while an annular seal member is accommodated in the second accommodation recess. The first accommodation recess is defined by two side surfaces. One of the two side surfaces nearer to the inlet port is tapered and the other is disposed perpendicular to the axis. The engagement member and seal member are mounted to the body before the corrugated pipe is connected. When a distal end of the corrugated pipe is inserted from the inlet port of the body, all turns of the engagement member are deformed to an elliptical shape from a circular shape each time the ridges of the corrugated pipe pass the engagement member, and restored to the original circular shape each time the grooves pass the engagement member. The corrugated pipe advances further into the body through repetition of the foregoing procedure several times, and the distal end of the corrugated pipe is inserted into the seal member. When the distal end of the corrugated pipe comes into contact with a step formed in the body, the corrugated pipe is prohibited from further advancing. In this way, the corrugated pipe is connected to the coupling. In that state, by intimately attaching the seal member to an outer periphery of the corrugated pipe such that the seal member is elastically deformed, the corrugated pipe and the body are sealed. When a withdrawing force is applied to the corrugated pipe, a radial outward force is applied to the engagement member from a tapered surface of the corrugated pipe. However, since a radially inward force (that is, force for pushing the engagement member back to the grooves of the corrugated pipe) is applied to the engagement member from the tapered surface of the first accommodation recess, the engagement member is deformed to an elliptical shape, thus being prohibited from climbing over the ridges of the corrugated pipe.

However, the coupling of the above Publication No. Hei 3-52493 has the following inconveniences. That is, since the engagement member is merely accommodated in the first accommodation recess, when a comparatively small amount of shock is applied to the coupling, in which the engagement member is already received in the body in a factory, during its transportation to a working site, the engagement member is dropped from the coupling. Moreover, since the engagement member climbs over the ridges of the corrugated pipe due to elastic deformation of each turn when the corrugated pipe is inserted into the coupling, the engagement member receives a force directing toward the grooves from the inner peripheral surface of the first accommodation portion. The result is that insertion resistance is increased.

In couplings illustrated in FIGS. 3 and 4 and also in FIGS. 5 and 6 of Japanese Laid-Open Utility Model Application No. Hei 3-91592, the through-hole of the body has an annular accommodation recess whose inner peripheral surface is tapered. A seal member having a tapered outer peripheral surface and an annular engagement member are beforehand received in this accommodation recess. The engagement member is formed in an annular shape by connecting both ends of a coil spring with each other. The engagement member is secured to an end of the seal member when the latter is molded. The seal member is biased toward an inlet port of the through-hole by another coil spring. In the coupling thus constructed, when a corrugated pipe is inserted into the through-hole of the body, a ridge of the foremost end of the corrugated pipe contacts the engagement member to move the engagement member further into the accommodation recess together with the seal portion. The seal member is limited its movement when it contacts an inner end of the accommodation recess. When the corrugated pipe is further advanced, the distal end of the corrugated pipe is inserted into the seal member passing through the engagement member. The engagement member is elastically enlarged in diameter each time the ridges of the corrugated pipe pass. After the ridges have passed, the engagement member is reduced in diameter and engaged in the grooves. Thereafter, when the worker releases his hold of the corrugated pipe, the seal member, the engagement member and the corrugated pipe are moved in the opposite direction to the inserting direction and the tapered outer peripheral surface of the seal member contacts the tapered inner peripheral surface of the accommodation recess, thereby sealing the body and the corrugated pipe. The engagement member, while being engaged in the grooves of the corrugated pipe, contacts a tapered retainer surface formed at the inlet port of the through-hole, thereby preventing the corrugated pipe from coming off.

However, in the coupling of the above Publication No. Hei 3-91592, nevertheless there is a change in insertion resistance each time the engagement member climbs over the ridges of the corrugated pipe a plurality of times, the worker cannot clearly recognize the completion of the connection work of the corrugated pipe to the coupling.

SUMMARY OF THE INVENTION

It is therefore an object of the present invention to provide a coupling capable of connecting a corrugated pipe easily and smoothly, positively prohibiting the corrugated pipe from coming off, preventing an engagement member from dropping out of the body before the corrugated pipe is connected, and letting the worker recognize clearly the connection of the corrugated pipe.

According to the present invention, there is provided a coupling for a corrugated pipe having ridges and grooves arranged alternately, comprising:

(a) a body having a through-hole, one end of the through-hole being served as an inlet port for insertion of the corrugated pipe, the through-hole being provided with an annular accommodation recess and an annular retainer portion formed on an inner periphery thereof in this order toward the inlet port;

(b) a cylindrical support member accommodated within the body, an end portion of the support member on the inlet port side being served as a receiving portion;

(c) a spring adapted to urge the support member toward the inlet port in order to bring the receiving portion to a location opposing an inner peripheral surface of the accommodation portion; and (d) a generally annular engagement member mounted on an outer periphery of the receiving portion of the support member in such a manner as to be elastically enlarged in diameter, the engagement member, when the support member is pushed in a direction away from the inlet port against the spring by a distal end of the corrugated pipe inserted from the inlet port, being disengaged from the end of the receiving portion on the inlet port side and reduced in diameter so as to be brought into engagement with an outer periphery of one of the grooves of the corrugated pipe, that part of the corrugated pipe, which projects from outer peripheries of the ridges, being retained by the retainer portion of the body while the engagement member is in engagement with the outer periphery of one of the grooves, to prevent the corrugated pipe from coming off.

BRIEF DESCRIPTION OF THE DRAWINGS

FIGS. 7 through 10 inclusive are sectional views respectively showing important portions of modified couplings of the present invention;

FIG. 11 is a sectional view of a further modified coupling of the present invention, connected to the corrugated pipe;

DETAILED DESCRIPTION OF THE EMBODIMENTS

Figure 1:
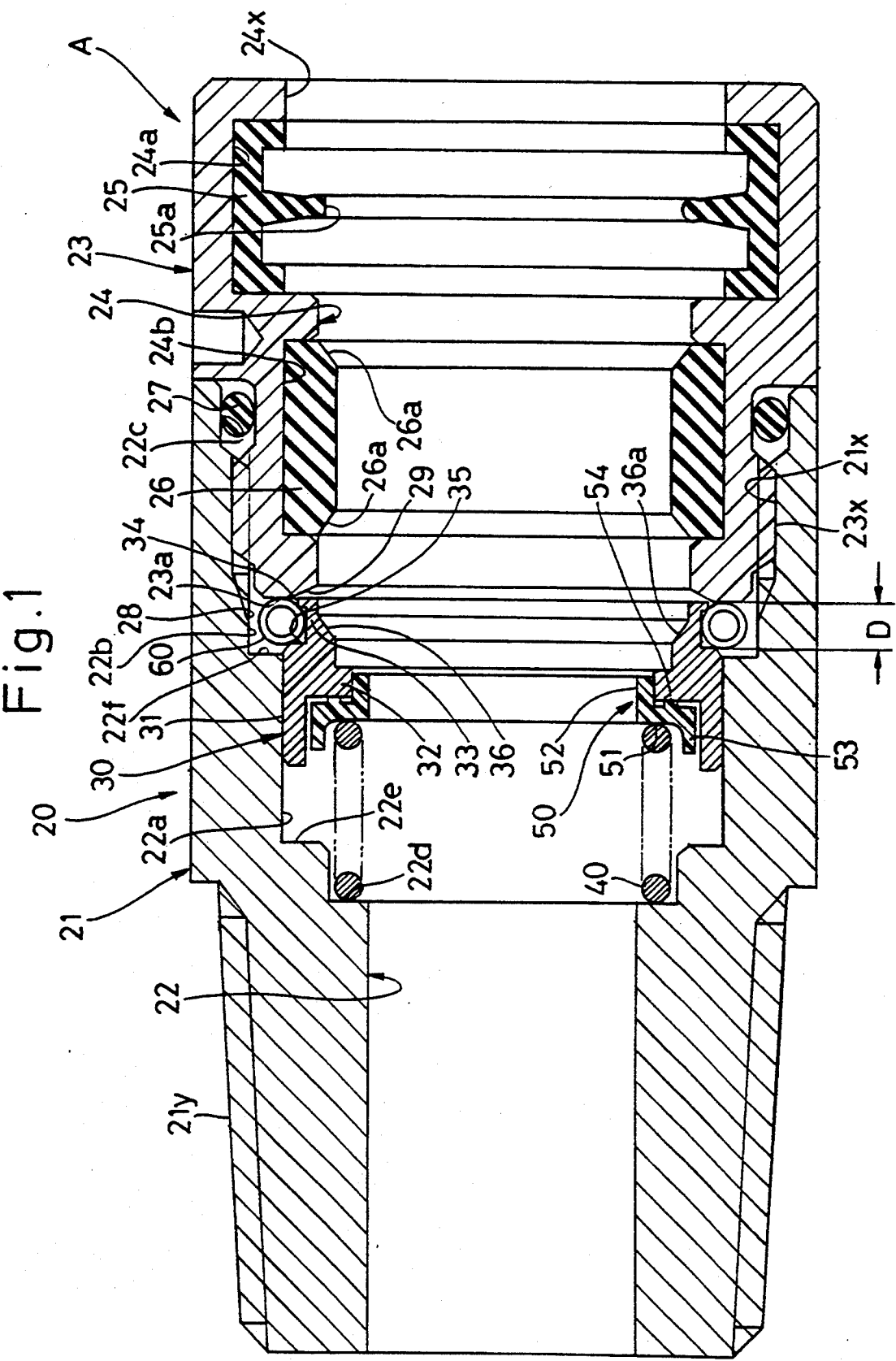
FIG. 1 is a vertical sectional view showing a coupling according to the present invention, in which the coupling is not yet connected to a corrugated pipe.

A coupling A of the first embodiment of the present invention will be described with reference to FIGS. 1 and 2. First of all, a gas pipe B (FIG. 2) to be connected to the coupling A is briefed. The gas pipe B comprises a thin wall corrugated pipe 10 of metal on which annular ridges 10a and grooves 10b are formed alternately, and a protection tube 11 of resin covering the outside of the corrugated pipe 10. The gas pipe B is so flexible that it can be bent by human power easily.

The coupling A comprises a body 20. This body 20 comprises two metal cylinders connected with each other. The first cylinder 21 has a through-hole 22 extending axially. This through-hole 22 is enlarged, step by step, in diameter in the right-hand direction in FIGS. 1 and 2. More specifically, the through-hole 22 has 5 inner peripheral surfaces each having a different diameter, and 4 steps. The third, fourth, and fifth inner peripheral surfaces from left are represented by 22a, 22b, and 22c, respectively. Likewise, the first, second, and third steps are represented by 22d, 22e, and 22f, respectively. A thread 21x is formed in the fourth inner peripheral surface 22b. A tapered thread 21y for connecting a gas instrument is formed in the outer peripheral surface of a left end of the first cylinder 21.

The second cylinder 23 has a through-hole 24 extending axially. A right-hand end 24x of this through-hole 24 is served as an inlet port for insertion of the gas pipe B. Two accommodation recesses 24a and 24b are formed axially spacedly in the inner peripheral surface of the through-hole 24 in this order from the inlet port 24x. Annular seal members 25 and 26 of soft rubber are accommodated in these accommodation recesses 24a and 24b, respectively. The right-hand seal member 25 is provided with an annular flange 25a projecting radially inwardly from a generally central part of its inner periphery. The inner diameter of this flange 25a is smaller than the outer diameter of the protection tube 11. The inner diameter of the remaining part of the flange 25a is larger than the outer diameter of the protection tube 11. The left-hand seal member 26 is provided at both ends thereof with tapered surfaces 26a, respectively. The inner diameter of an intermediate portion of this seal member 26 is smaller than the outer diameter of any ridges 10a and larger than the outer diameter of any grooves 10b. A thread 23x is formed on the outer periphery of the left-hand end of the second cylinder 23.

The pair of cylinders 21 and 23 are coaxially connected through engagement between the threaded portions 21x and 23x. In this connected state, a seal member 27 is interposed between the inner peripheral surface 22c of the right-hand end of the cylinder 21 and the outer peripheral surface of the cylinder 23 in order to seal them. An annular accommodation recess 28 is defined by the inner peripheral surface 22b and step 22f of the cylinder 21 and a distal end face 23a of the cylinder 23. A tapered annular retainer surface 29 (retainer portion) is formed adjacent to the distal end face 23a of the second cylinder 23. The inner diameter of this retainer surface 29 is gradually reduced toward the inlet port 24x.

The inner peripheral surface 22a of the cylinder 21 is served as a guide portion for slidably guiding a metal slider 30 (support member). The slider 30 includes a cylindrical base portion 31, an annular flange 32 formed on the inner periphery of this base portion 31, a cylindrical receiving portion 33 projecting axially rightward (in the direction of the inlet port 24x) from the base portion 31, and an annular projection 34 formed on the outer periphery of the right-hand end of the receiving portion 33. The outer diameter of the base portion 31 is smaller than the inner diameter of the guide portion 22a by about 10 μm to 50 μm. A silicon oil or grease is interposed between a tiny gap between the base portion 31 and the guide portion 22a in order to reduce frictional resistance. The outer diameter of the receiving portion 33 is smaller than the base portion 31, and a step 35 is formed therebetween. A tapered abutment surface 36 (abutment portion) is formed on the inner periphery of a location spaced apart from a right-hand end of the receiving portion 33 by a predetermined distance. The diameter of the abutment surface 36 is gradually increased in the right-hand direction. A coating layer 36a having a thickness of about 50 μm to 150 μm is formed on the abutment surface 36. This coating layer 36a is formed of a soft resin or the like.

The slider 30 is biased in the right-hand direction (in the direction of the inlet port 24x) by a compressed coil spring 40. A left end of this coil spring is abutted directly against the step 22d of the cylinder 21, while a left end thereof is abutted against the flange 32 of the slider 33 through a spring seat 50.

The spring seat 50 is formed of a material having a small frictional resistance, such as a fluororesin, a polyacetal resin or the like. The spring seat 50 includes an annular base portion 51 extending in a direction perpendicular to the axis of the body 20, a cylindrical portion 52 extending in a right-hand direction from an inner peripheral edge of the base portion 51, a cylindrical portion 53 extending in a left-hand direction from an outer peripheral edge of the base portion 51, and an annular projection 54 formed on a right-hand surface of the base portion 51. The projection 54 is in contact with the flange 32 of the slider 30 in order to transmit the force of the coil spring 40 to the slider 30. The cylindrical portion 52 is accommodated in the flange 32. The outer diameter of the cylindrical portion 52 is slightly smaller than the inner diameter of the flange 32.

The coupling A further comprises an annular engagement member 60 formed by connecting both ends of a coil spring. Before the gas pipe B is inserted into the coupling A, the engagement member 60, which is mounted on the outer periphery of the receiving portion 33 of the slider 30 as shown in FIG. 1, is accommodated in the accommodation recess 28 of the body 20. In that mounted state, the engagement member 60 is elastically enlarged in diameter. Nevertheless the slider 30 is urged rightward under the influence of the force of the coil spring 40, the rightward movement of the slider 30 is limited because the engagement member 60 is interposed between the step 35 and the distal end face 23a of the cylinder 23. In that state, the receiving portion 33 of the slider 30 is disposed in such a manner as to oppose the inner peripheral surface 22b of the accommodation recess 28, thereby closing the accommodation recess 28. The diameter D (FIG. 1) of each turn of the engagement member 60 is smaller than a gap between the inner peripheral surface 22b and the outer peripheral surface of the receiving portion 33 of the slider 33.

Figure 2:
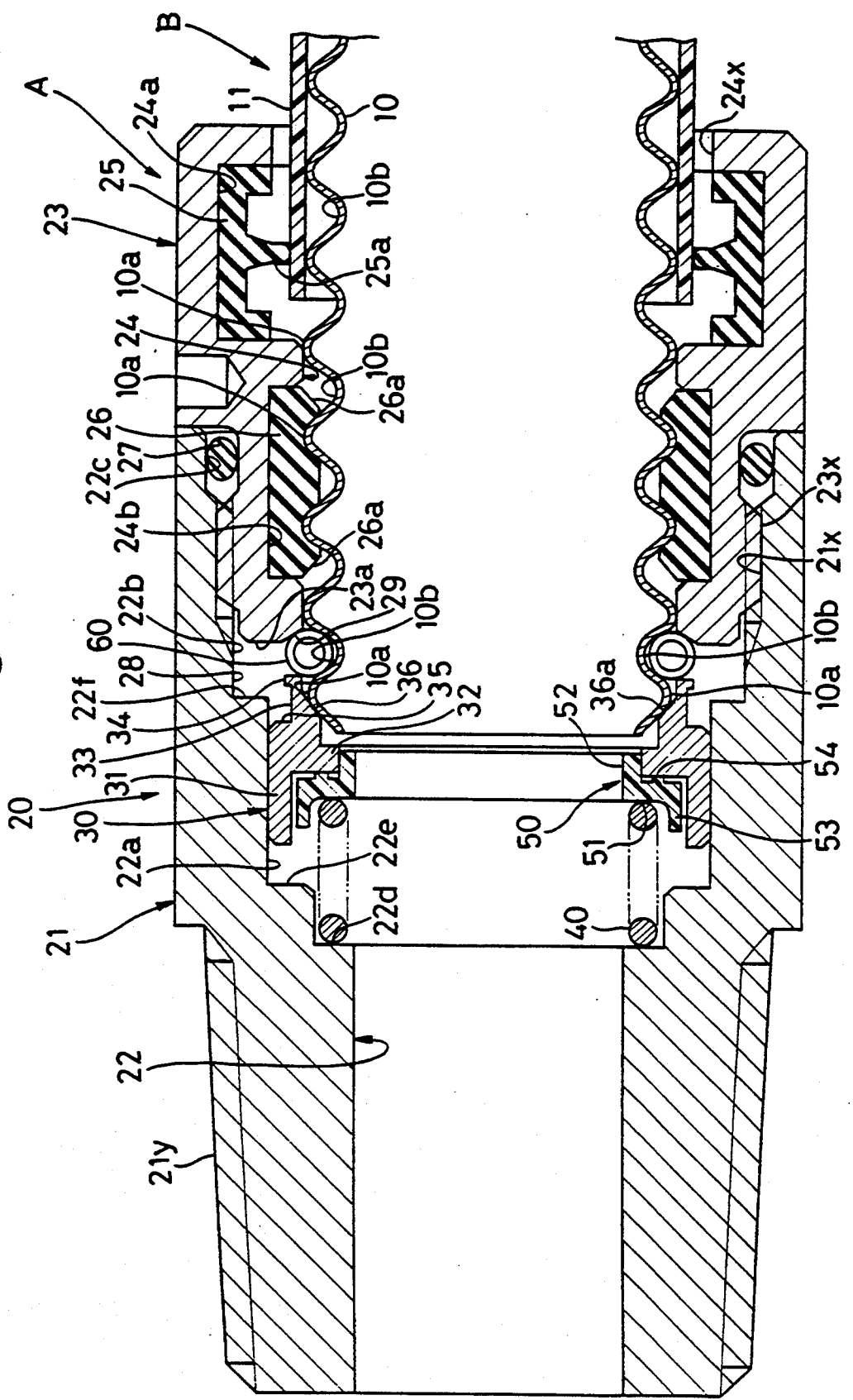
FIG. 2 is a vertical sectional view of the coupling, in which the coupling is already connected to a corrugated pipe.

In the coupling A thus constructed, as shown in FIG. 1, since the engagement member 60 is accommodated in the accommodation recess 28 of the body 20 and mounted on the outer periphery of the receiving portion 33 of the slider 30 closing this accommodation recess 28, the engagement member 60 can be positively prevented from dropping.

The coupling A is beforehand attached to a gas instrument such as a gas cock, a header, a cheese, or the like by threading the tapered thread 21y into a thread hole of the gas instrument. In that state, one end of the gas pipe B is connected to the coupling A. At the end of the gas pipe B, the protection tube 11 is beforehand cut out by a predetermined length from the end face, and an end of the corrugated pipe 10 is exposed.

When the end of the corrugated pipe 10 is inserted from the inlet port 24x of the coupling A, a tapered surface of the first ridge 10a contacts the abutment surface 36 of the slider 30. In that state, the right-hand end of the receiving portion 33 of the slider 30 is in a position generally corresponding to the ridge 10a of the corrugated pipe 10a.

When the corrugated pipe 10 is further advanced, the slider 30 is moved leftward against the force of the coil spring 40. At that time, nevertheless the receiving portion 33 of the slider 30 is separated from the accommodation recess 28, the engagement member 60 is prevented from moving leftward by the step 22f of the body 20 (i.e., side surface of the accommodation recess 28). As a result, the engagement member 60 is separated from the receiving portion 33 and reduced in diameter by the elastic force thereof, so as to engage in the grooves 10b of the corrugated pipe 10. A snap-fitting sound is generated the moment the engagement member 60 engages in the grooves 10b of the corrugated pipe 10. Simultaneously, vibration caused by this shock is transmitted to the worker's hand through the corrugated pipe 10. This makes it possible for the worker to recognize easily the completion of the engagement between the engagement member 60 and the corrugated pipe 10, and therefore the completion of the connection between the corrugated pipe 10 and the coupling A. When the engagement member 60 is in engagement in the grooves 10b of the corrugated pipe 10, it may be either in a natural state or in an elastically increased state in diameter.

When the engagement member 60 is separated from the receiving portion 33, it is necessary for the engagement member 60 to be further enlarged in diameter, in order to climb over the projection 34. At that time, the insertion resistance of the corrugated pipe 10 is temporarily raised. The insertion resistance is lowered after the completion of the engagement between the engagement member 60 and the grooves 10b of the corrugated pipe 10, which is achieved, as mentioned, only after the engagement member 60 climbs over the projection 34. It is also possible for the worker to recognize clearly the completion of the engagement between the engagement member 60 and the corrugated pipe 10 based on this change of insertion resistance.

Contacting of the left-hand end of the slider 30 to the step 22e of the body 20 limits the insertion depth of the corrugated pipe 10. When the worker releases his hold of the corrugated pipe 10, the slider 30 as well as the corrugated pipe 10 are returned rightward by the force of the coil spring 40, and the engagement member 60 is retained on the retainer surface 29 which is formed on a distal end of the cylinder 23. As a consequence, even if the corrugated pipe 10 is pulled rightward, the corrugated pipe 10 can be prevented from coming off the coupling A. Nevertheless the tapered portion of the corrugated pipe 10 applies a radial outward force to the engagement member 60 when the corrugated pipe 10 is pulled rightward, the engagement member 60 is positively prevented from being elastically enlarged in diameter because a radial Inward force is applied to the engagement member 60 from the retainer surface 29.

In the state where the gas pipe B is in connection with the coupling A, the flange 25a of the seal member 25 contacts, in an elastically deformed state, the outer peripheral surface of the protection tube 11 of the gas pipe B and the seal member 26 contacts, also in an elastically deformed state, the ridges 10a of the corrugated pipe 10. Therefore, seal can be applied between the body 20 and the gas pipe B. Moreover, the use of the slider 30 helps to further enhance the sealing ability. More specifically, the outer peripheral surface of the base portion 31 of the slider 30 contacts the inner peripheral surface of the guide portion 22a of the body 20, and the tapered surface of the end portion of the corrugated pipe 10 contacts the abutment surface 36 of the slider 30 over the entire periphery thereof. Accordingly, the quantity of gas leaking toward the seal members 25 and 26 is extremely small, and this extremely small quantity of gas can be positively prevented from leaking by the seal members 25 and 26. Furthermore, since the coating layer 36a is formed on the abutment surface 36, the sealing ability can be further enhanced.

Particularly, even in the event the seal members 25 and 26 are burnt or deteriorated caused by accidental fire, or the like, the metal body 20, slider 30, coil spring 40, and corrugated pipe 10 are not disappeared and a mutual contacting relation can be maintained. Therefore, a large amount of gas can be prevented from leaking. The result is that a scale enlargement of fire caused by gas leak can be prevented.

By turning the body 20, the coupling A kept connected to the gas pipe B can be removed from and attached again to the gas instrument. At that time, since the frictional resistance between the slider 30 and the guide portion 22a as well as the frictional resistance between the slider 30 and tile coil spring 40 are very small, the body 20 can be turned easily. Further, the frictional resistance between the abutment surface 36 of the slider 30 and the corrugated pipe 10 is larger than the sum of the frictional resistance between the slider 30 and the guide portion 22a and the frictional resistance between the slider 30 and the coil spring 40. Because of it, the slider 30 is not rotated in response to the rotation of the body 20. This feature offers the following advantage. That is, the shapes of the ends of the corrugated pipe 10 are not perfect circles. Since the coating layer 36a of the slider 30 is brought into abutment with one end of this corrugated pipe 10 by the force of the coil spring 40, the surface of the coating layer 36a is slightly irregularly formed (in other words, the layer 36a has an irregular surface) so as to correspond to the configuration of the end of the corrugated pipe 10. This being the case, if the slider 30 is turned relative to the corrugated pipe 10, a tiny gap is possibly formed between the coating layer 36a and the corrugated pipe 10 because the configuration of the end of the corrugated pipe 10 is not coincident with the configuration of the surface of the coating layer 36a. However, since the slider 30, as mentioned, is not turned relative to the corrugated pipe 10, this possibility can be removed and a much better seal can be obtained.

Figure 3:
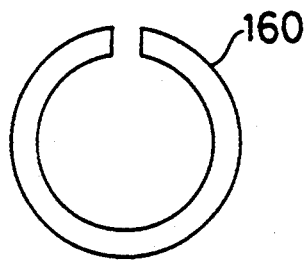
FIGS. 3 through 6 inclusive are front views respectively showing modified engagement members.
Figure 4:
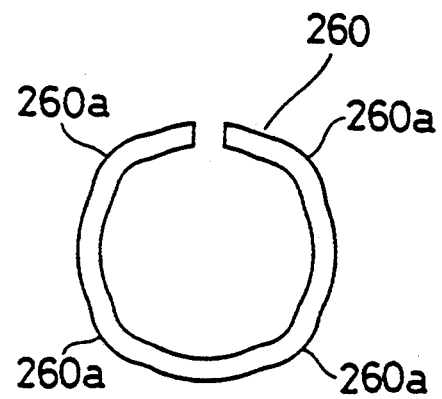
Figure 5:
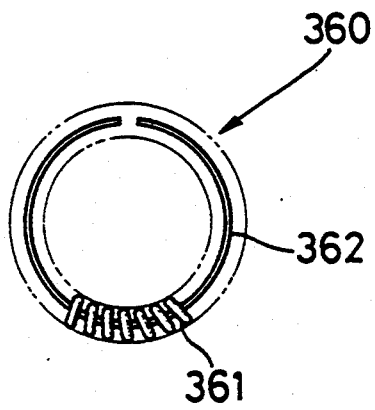
Figure 6:
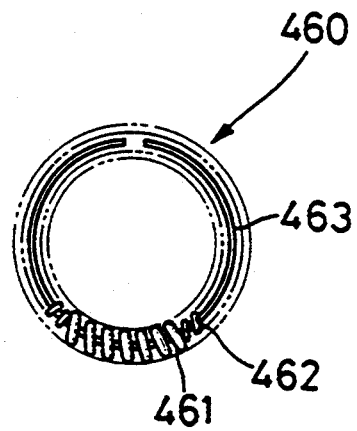

Instead of the engagement member used in the above embodiment, engagement members of FIGS. 3 through 6 may be used. Specifically, an engagement member 160 of FIG. 3 is formed of a circular elastic ring, partly cutaway. An engagement member 260 of FIG. 4 is formed of a circular elastic ring, partly cutaway, having curved portions 26 projecting outwardly at spaces of 90 degrees. In the state where the engagement member 260 is engaged in the grooves 19b (FIG. 2) of the corrugated pipe 10, the curved portions 260a contacts the retainer surface 29. An engagement member 360 of FIG. 5 includes a coil spring 361 whose both ends are connected with each other, and a circular elastic spring 362, partly cutaway, accommodated in this coil spring 361. An engagement member 460 of FIG. 6 includes a coil spring 461 whose both ends are connected with each other, another coil spring 462 which is accommodated in this coil spring 461 and whose both ends are connected with each other, and a circular elastic ring 463, partly cutaway, accommodated in this coil spring 462. The diameter of each turn of the coil spring 462 is smaller than the diameter of the turn of the coil spring 462. These engagement members 160, 260, 360, and 460 are all made of metal, and elastically enlarged in diameter in the state where it is mounted on the outer periphery of the receiving portion 33 (FIGS. 1 and 2) of the slider 30. When engaged in the grooves 10b of the corrugated pipe 10, the engaging members are either in natural states or elastically enlarged in diameter.

Other embodiments of the coupling of the present invention will now be described. In the following embodiments, those component parts corresponding to those of the preceding embodiment are represented by identical reference numerals and description thereof is omitted.

An annular retainer surface 129 (retainer portion) is formed at a location away from the distal end face 23a of the cylinder 23 of the coupling shown in FIG. 7. This retainer surface 129 is disposed perpendicular to the axis of the body 20. The inner peripheral surface of the cylinder 23, which is situated between the retainer surface 129 and the distal end face 23a, is served as a holder portion 125. The inner diameter of this holder portion 125 is equal to or slightly larger than the outer diameter of the engagement member 60 engaged in the grooves 10b of the corrugated pipe 10. In this embodiment, if the corrugated pipe 10 is pulled rightward under the connected condition, the engagement member 60 is retained on the retainer surface 129 in the state where the engagement member 60 is accommodated in the holder portion 125, thereby preventing the corrugated pipe 10 from coming off. At that time, nevertheless the engagement member 60 is subjected to a radial outward force from the tapered surface of the corrugated pipe 10, the engagement member is prohibited from elastically enlarged in diameter owing to the holder portion 125 and also prevented from climbing over the ridges 10a of the corrugated pipe 10. As a consequence, the gas pipe B can be more positively prevented from coming off.

A coupling shown in FIG. 8 has a generally same construction as the coupling of FIG. 7, but the former employs a tapered retainer surface 229 instead of the retainer surface 129 of FIG. 7.

In the coupling of FIG. 9, an annular abutment surface 336 of the slider 30 is disposed perpendicular to the axis of the body 20. A coating layer 336a having a thickness of about 100 μm to 200 μm, formed of a soft resin, is formed on this abutment surface 336. Since an entire peripheral edge of the distal end of the corrugated pipe 10 contacts the abutment surface 336 of the slider 30, a favorable sealing function is exhibited.

In the coupling of FIG. 10, an annular abutment portion 436 having the shape of a thin plate spring of about 0.1 mm to 0.3 mm is formed at a location away, by a predetermined distance, from the right-hand end on the inner periphery of the receiving portion 33 of the slider 30. This abutment portion 436 is disposed perpendicular to the axis of the body 20 when the former is in its natural state. The abutment portion 436 is abutted against the distal end of the corrugated pipe 10 over its entire periphery, thereby the sealing is performed. The spring sheet 450 is formed of metal and has an annular projection 455 on its right-hand surface. When this projection 455 comes into contact with the abutment portion 436 of the slider 30, an amount of elastic deformation of the abutment portion 436 is limited. In this embodiment, the distal end face 423a of the cylinder 23 is served as the retainer surface for the engagement member 60.

In the coupling of FIG. 11, one end of the coil spring 40 directly contacts a side surface 32a (the step of the slider facing the opposite direction with respect to the inlet port 24x) of the slider 30. The slider 30 further has an annular projection 538 formed on the inner peripheral surface of the base portion 31. This projection 538 is disposed spaced apart from the step 32a in opposing relation. The turn of one end of the coil spring 40 is inserted between this projection 538 and the step 32a.

Figure 13:
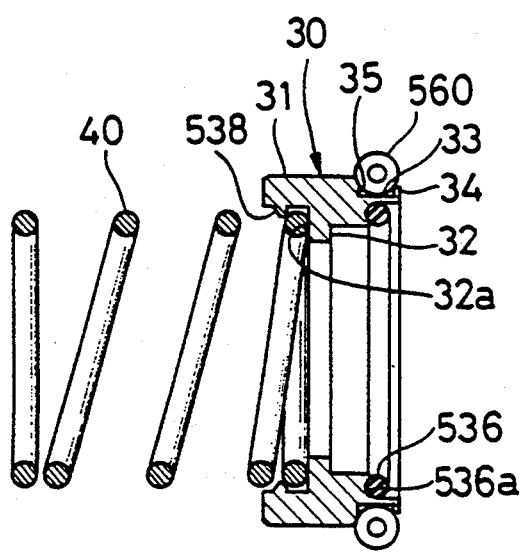
FIG. 13 is a sectional view showing an assembly of a slider, a coil spring, and an engagement member applied to the coupling of FIG. 11, in which the coil spring is illustrated shorter than the actual one.
Figure 14:
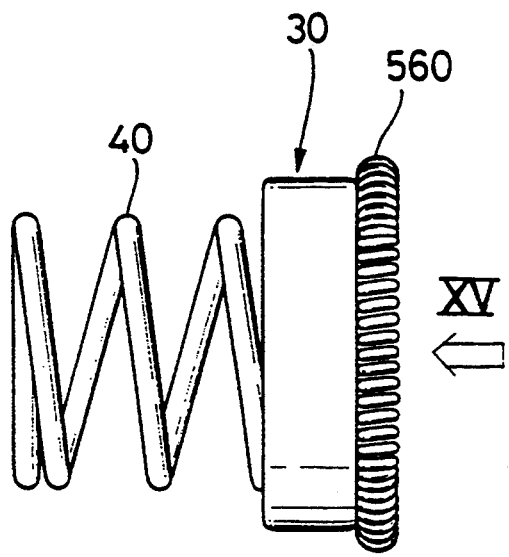
FIG. 14 is a side view of the assembly of FIG. 13.
Figure 15:
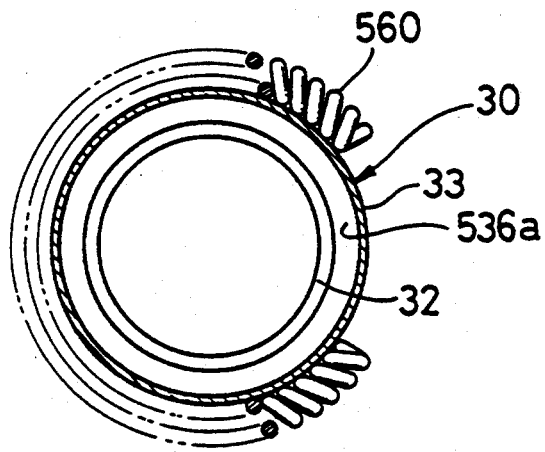
FIG. 15 is a front view, when viewed in the direction XV of FIG. 14.

The slider 30 thus constructed has the following advantages. The coil spring 40, the slider 30 and an engagement member 560 can be made into one assembly as shown in FIGS. 13 through 15, when they are accommodated in the cylinder 221. More specifically, the engagement member 560 is mounted on the outer periphery of the receiving portion 33 of the slider 30 in such a manner as to be elastically enlarged in diameter. By being inserted at the turn of one end between the projection 538 and the step 32a, the coil spring 40 is connected to the slider 30. This assembly can be inserted easily into the cylinder 21.

Figure 16:
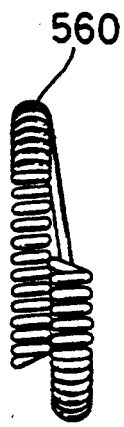
FIG. 16 is a side view showing a natural state of the engagement member, which is applicable to the coupling of FIG. 11.

The engagement member 560, as shown in FIG. 16, is formed by curving a coil spring to make a circular shape, both ends thereof being not connected with each other and overlapped one upon the other in a natural state. When this engagement member 560 is mounted on the outer periphery of the receiving portion 33, its both ends are separated as shown in FIG. 15. The both ends are also separated when this engagement member 560 is inserted into the grooves 10b of the corrugated pipe 10, the engagement member 560 being elastically enlarged in diameter and being caused to contact the outer peripheral surface of one of the grooves by the elastic force. This engagement member 560 is low in manufacturing cost because both ends thereof are not connected with each other.

Furthermore, an accommodation recess 536a is formed in the inner periphery of the receiving portion 33 of the slider 30 in such a manner as to oppose the inlet port 24x. A seal member 536 formed of an elastic material is accommodated in this accommodation recess 536a. This seal member 536 is served as an abutment portion. Through abutment between the tapered surface of the distal end and this seal member 536, a favorable sealing is obtained.

In the coupling of FIG. 11, an annular seal member 526 formed of an elastic material is accommodated in the accommodation recess 24b of the cylinder 23. This seal member 526 has three annular projections 526a formed on its outer periphery at equal distances. When the corrugated pipe 10 is in the inserted condition, the sealing performance is further enhanced because the projections 526a of the seal member 526 are abutted against the inner peripheral surface of the accommodation recess 24b with a comparatively large force.

A distance D between adjacent two projections 526a is different from a pitch P of the corrugated pipe 10. The important thing is that when one of the ridges 10a is in a position corresponding to one of the projections 526a during the insertion process of the corrugated pipe 10, the remaining ridges 10a are not in such positions as to correspond to any of the remaining projections 526a. In other words, a relation between the distance D and the pitch P can be given by following expression.

$$nD \neq mP$$

In the above expression, "n" is an integer equal to or smaller than a number obtained by subtracting 1 from the number of the projections 526a and "m" is an integer equal to or smaller than a number obtained by subtracting 1 from a maximum value of the number of the ridges which contact the seal member 526 when the corrugated pipe 10 passes the seal member 526. In this embodiment, since three projections 526a are provided, "n" is 1 or 2, and "m" is 1. Accordingly, in this embodiment, the distance D between adjacent two projections 526a is preferably 0.70 times to 0.80 times the pitch P, and actually, it is 0.75 times.

Figure 17:
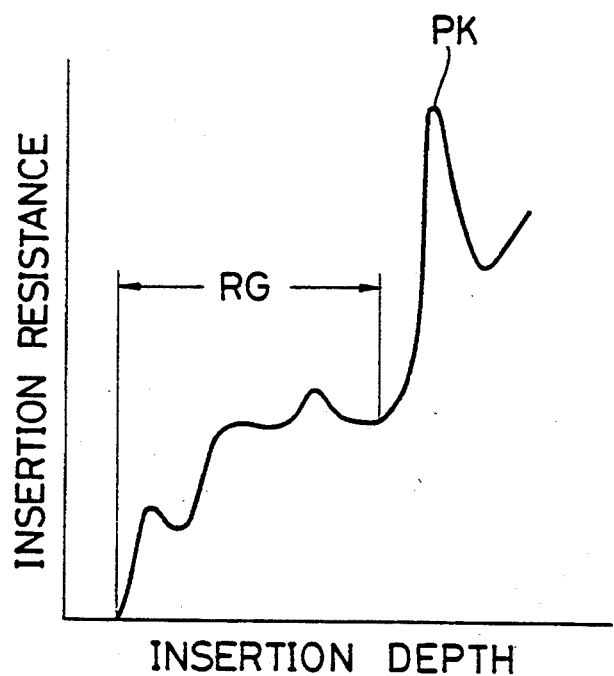
FIG. 17 is a graph showing insertion resistance when the corrugated pipe is inserted into the coupling of FIG. 11.

Advantages obtainable from the relation between the distance D and the pitch P will be described with reference to FIG. 17. When the corrugated pipe 10 is inserted into the coupling, an insertion resistance caused by the seal member 526 is changed as an insertion depth (this insertion depth refers to a distance between the distal end of the corrugated pipe 10 and the right-hand end face of the cylinder 23) is increased. Since it can be prevented that a plurality of the ridges 10a simultaneously pass a plurality of the ridges 526a, abrupt increase and abrupt decrease of the insertion resistance caused by the seal member 526 are never taken place. An insertion resistance caused by only this seal member 526 appears in an insertion depth range (RG) of FIG. 17. As the insertion depth is further increased, the distal end portion of the corrugated pipe 10 contacts the slider 30. Since an insertion resistance caused by the coil spring 40 is additionally applied, the insertion resistance is increased. Moreover, an insertion resistance caused by the engagement member 560 climbing over the projection 34 of the slider 30 is additionally applied. As a consequence, the insertion resistance is abruptly increased but it is abruptly decreased the moment when the engagement member 560 is separated from the slider 30. In FIG. 17, the peak of the insertion resistance taken place at that time is indicated by character PK. The worker can clearly distinguish the abrupt increase and decrease of the insertion resistance taken place at that time from the comparatively gentle low insertion resistance caused by the seal member 526. This means that the worker can clearly recognize the completion of a connecting work of the corrugated pipe 10. Even in the case where the slider 30 has no projections 34, the worker can recognize that the distal end of the corrugated pipe 10 reaches the slider 30 based on the abrupt increase of the insertion resistance caused by the coil spring 40, thus enabling him to carry out a reliable connecting work of the corrugated pipe 10.

Figure 12:
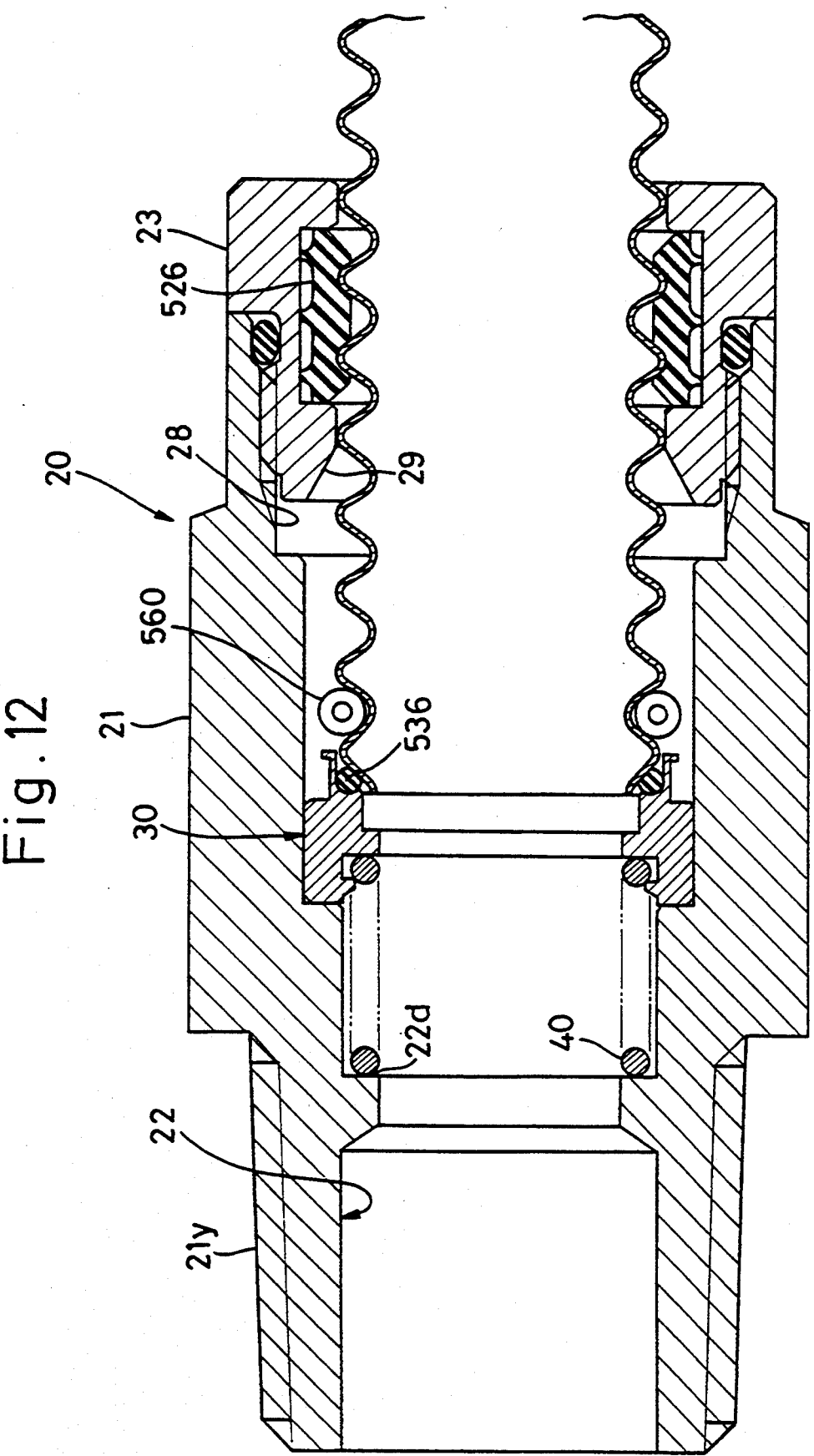
FIG. 12 is a sectional view showing the coupling of FIG. 11, connected to a long corrugated pipe.

Furthermore, the coupling of FIG. 11 has the following advantages because it has a long guide portion 22a. In the example of FIG. 11, a corrugated pipe 10, which is adjusted in length by being cut one end thereof, is in a connected condition. However, in the case where this coupling is used, it is not necessary to cut the end of the corrugated pipe 10 if the length of the corrugated pipe is within an allowable range determined by the length of the guide portion 22a. In that case, as shown in FIG. 12, the corrugated pipe 10 is inserted deep into the body 10. Even if the worker releases his hold of the corrugated pipe 10 thereafter, the corrugated pipe 10 are sometimes not retracted. For example, when, in the condition that one end of the corrugated pipe 10 is already connected to another coupling, the other end is inserted into the coupling of the embodiment while curving the corrugated pipe 10 with a strong force, the corrugated pipe 10 is not retracted because the elasticity of the corrugated pipe 10 overcomes the coil spring 40. However, there is no problem in this condition. The reason is that a favorable sealing between the corrugated pipe 10 and the body 20 is maintained. Even if the worker pulls the corrugated pipe 10 with a strong power, since the engagement member 560 is abutted against the retainer surface 29, the corrugated pipe 10 is prevented from coming off.

Figure 18:
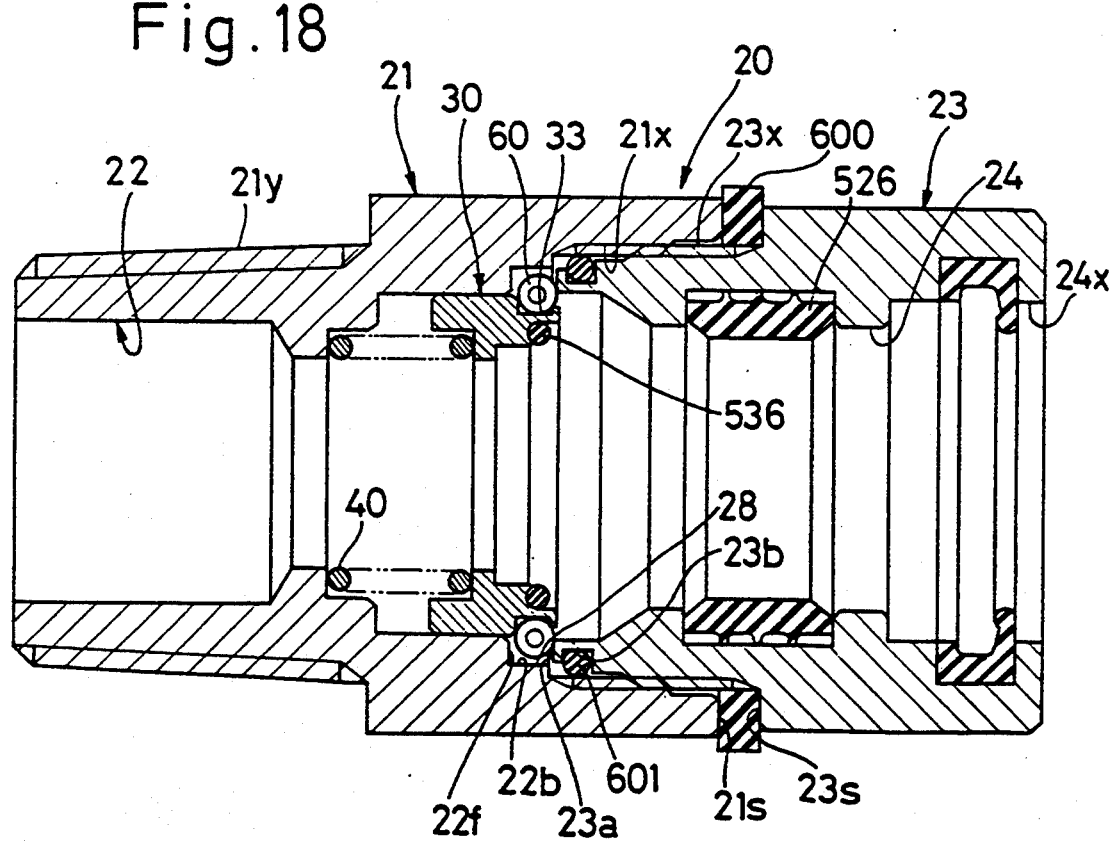
FIG. 18 is a sectional view showing a whole picture of a further modified coupling of the present invention.

Next, couplings shown in FIGS. 18 through 22 will be described. FIG. 18 depicts a coupling before connection. The cylinder 23 is shallowly threadedly engaged with the cylinder 21, and a gap is formed between a step 23s formed on the outer periphery of the cylinder 23 and a right-hand end face 21s of the cylinder 21. A stopper 600 having a C-ring shape formed of an elastic material is disposed in this gap. The engagement member 60 is accommodated in the accommodation recess 28 which is defined by the distal end 23a of the cylinder 23 as well as the step 22f and inner peripheral surface 22b of the cylinder 21. This engagement member 60 is mounted on the outer periphery of the receiving portion 33 of the slider 30. The slider 30 pushed by the coil spring 40 is caused to contact with the distal end face 23a of the cylinder 23 through this engagement member 60. The axial length of the accommodation recess 28 is slightly longer than the diameter D of the turn of the engagement member 60. The outer diameter of the distal end of the cylinder 23 is smaller than the inner diameter of the accommodation recess 28. In this coupling, an annular recess 23b is formed in the outer periphery of the distal end of the cylinder 23, and an annular seal member 601 is accommodated in this recess 23b.

Figure 19:
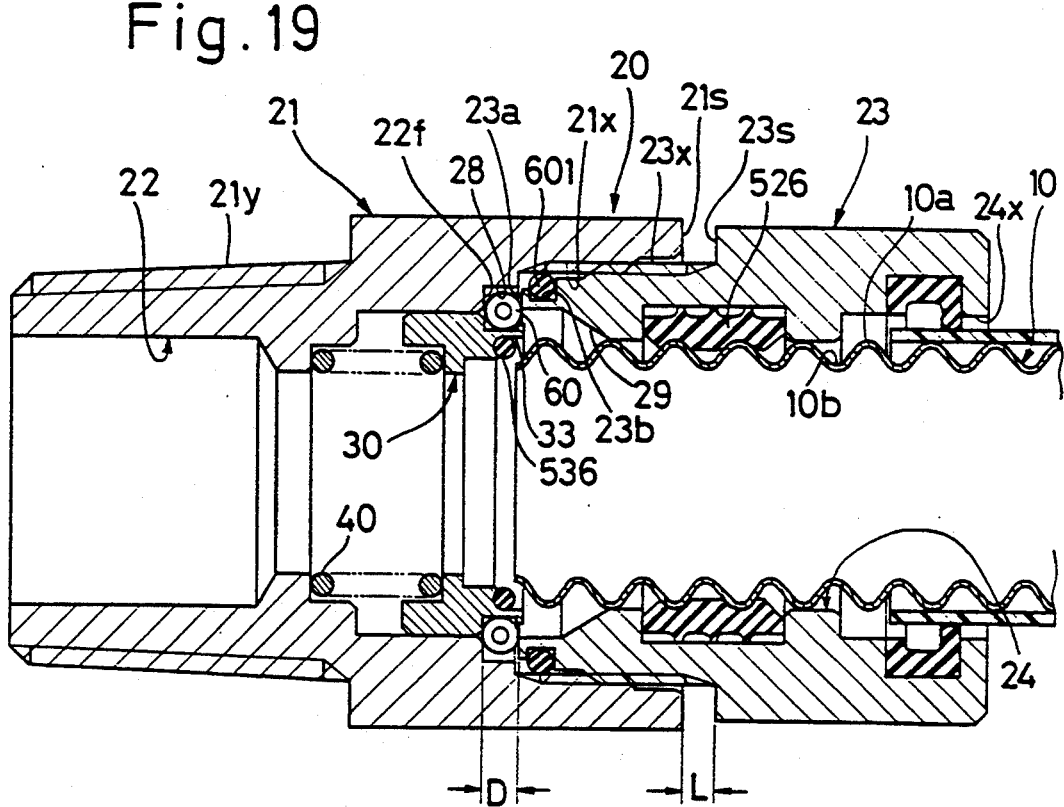
FIG. 19 is a sectional view of the coupling of FIG. 18, in which an insertion amount of the corrugated pipe is insufficient.

If an insertion amount of the corrugated pipe 10 into the coupling of FIG. 18 is insufficient, as shown in FIG. 19, the distal end of the corrugated pipe 10 does not reach the slider 30 and therefore, the engagement member 60 is not engaged in the grooves 10b of the corrugated pipe 10. Therefore, when the cylinder 23 is screwed into the cylinder 21 after removing the stopper 600, a screwing amount of the former is no more than a difference between the axial length of the accommodation recess 28 and the diameter of each turn of the engagement member 60. A further screwing advancement of the cylinder 23 is prevented by the distal end face of the cylinder 23 contacting the step 22f of the cylinder 21 through the engagement member 60. The worker can know that the insertion of the corrugated pipe 10 is insufficient from the fact that the cylinder 23 cannot be screwed into the coupling until its step 23s is brought into contact with the right-hand end face 21s of the cylinder 21.

Figure 20:
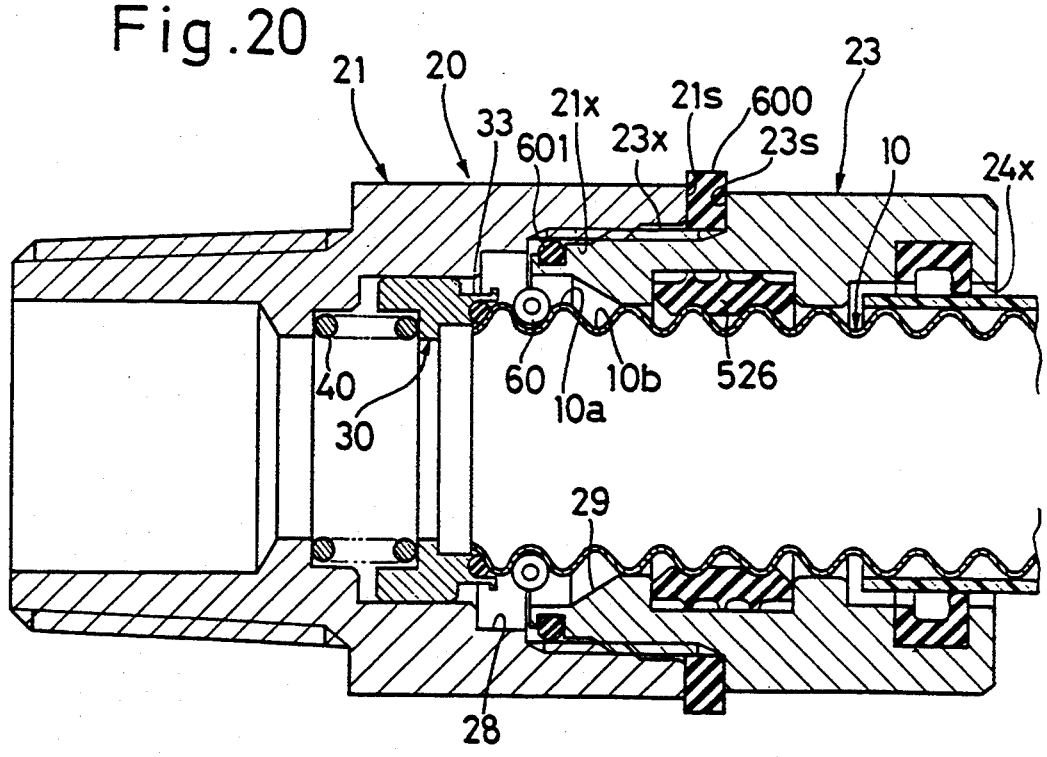
FIG. 20 is a sectional view of the coupling of FIG. 18, showing a state of the engagement member immediately after fitted in the corrugated pipe, in which the amount of insertion of the corrugated pipe is sufficient.
Figure 21:
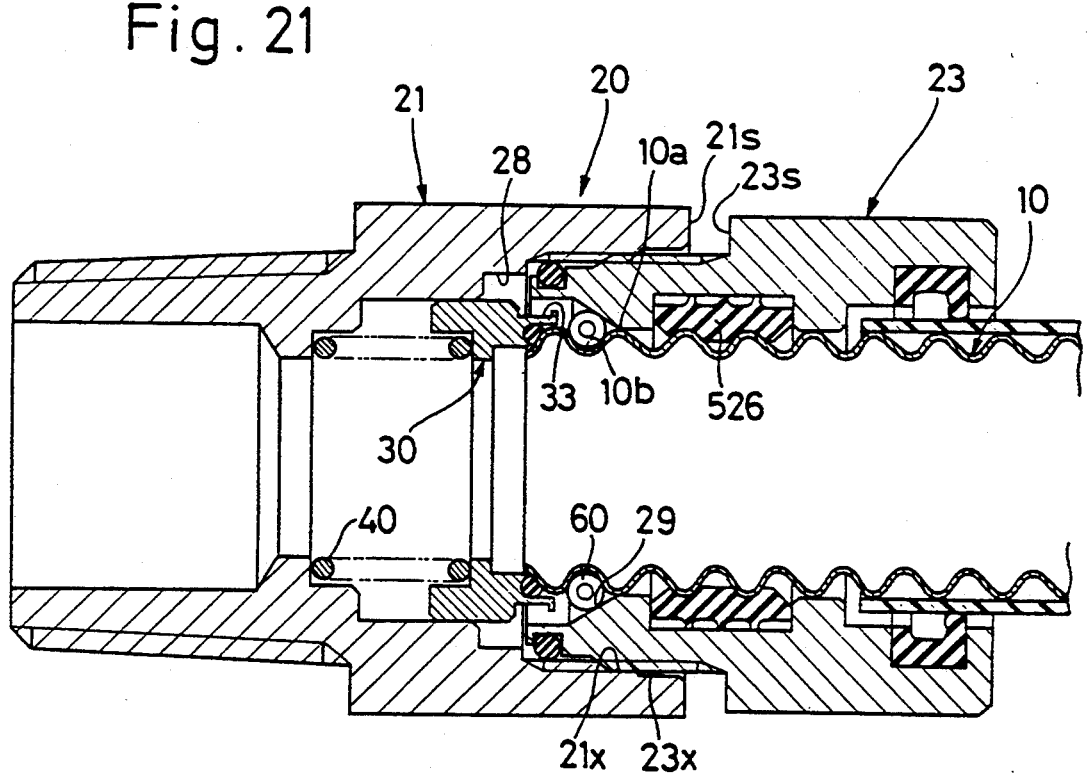
FIG. 21 is a sectional view showing a state obtainable when a hand is removed from the corrugated pipe which is held in the state of FIG. 20.
Figure 22:
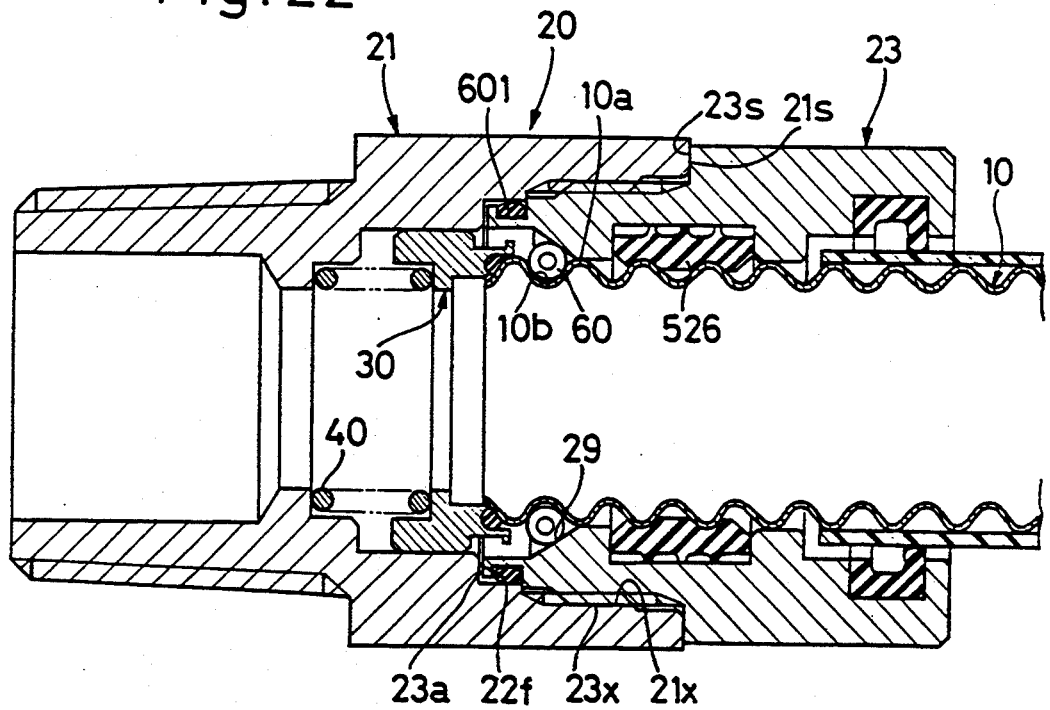
FIG. 22 is a sectional view showing a state of completion of the connection work achieved by screwing a second cylinder into a first cylinder after the coupling and corrugated pipe are brought into the state of FIG. 21.

When the insertion amount of the corrugated pipe 10 is sufficient, as shown in FIG. 20, the engagement member 60 is separated from the receiving portion 33 of the slider 30 and engaged in the grooves 10b of the corrugated pipe 10. If the worker releases his hold of the corrugated pipe 10 thereafter, as shown in FIG. 21, the corrugated pipe 10 is retracted and the engagement member 60 is retained on the retainer surface 29. In that state, the engagement member 60 does not limit the screwing advancement of the cylinder 23 any more. Therefore, when the cylinder 23 is screwed into the cylinder 21, as shown in FIG. 22, the step 23s of the cylinder 23 can be brought into contact with the right-hand end face 21s of the cylinder 21. This makes it possible for the worker to confirm the completion of the connecting work. In this final state, the seal member 601 contacts the inner peripheral surface 22a of the cylinder 21 in the state where the former is elastically deformed.

As apparent from the above description on operation, in order to make it possible for the worker to confirm the completion of the connecting work of the corrugated pipe 10 from the fact that the step 23s of the cylinder 23 contacts the right-hand end face 21S of the cylinder 21, the following conditions are required. That is, as shown in FIG. 19, in the threaded engagement between the cylinders 21 and 23 wherein the distal end face 23a of the cylinder 23 and the step 22f of the cylinder 21 are separated by a distance equal to the diameter D of each turn of the engagement member 60, the step 23s of the cylinder 23 and the right-hand end face 21s of the cylinder 21 are spaced apart, and this spaced apart distance L is equal to or shorter than the diameter D of each turn of the engagement member 60. This distance L is preferably equal to or longer than a half of the diameter D of each turn of the engagement member 60.

The present invention is not limited to the above embodiments, and various modifications can be made. For example, the invention can be likewise applied to a case where the body of a gas instrument serves also as the body of a coupling.

What is claimed is:

1. A coupling for a corrugated pipe having ridges and grooves arranged alternately, comprising:
   (a) a body having a through-hole, one end of the through-hole being served as an inlet port for insertion of said corrugated pipe, the through-hole being provided with an annular accommodation recess and an annular retainer portion formed on an inner periphery thereof in this order toward the inlet port;
   (b) a cylindrical support member accommodated within said body, an end portion of the support member on the inlet port side being served as a receiving portion;
   (c) a spring adapted to urge said support member toward the inlet port in order to bring the receiving portion to a location opposing an inner peripheral surface of the accommodation portion; and
   (d) a generally annular engagement member mounted on an outer periphery of the receiving portion of said support member in such a manner that when mounted, the annular engagement member is elastically enlarged in diameter, said engagement member, when support member is pushed in a direction away from the inlet port against the spring by a distal end of said corrugated pipe inserted from the inlet port, being disengaged from the end of the receiving portion on the inlet port side and reduced in diameter so as to be brought into engagement with an outer periphery of one of the grooves of said corrugated pipe, that part of said corrugated pipe, which projects from outer peripheries of the ridges, being retained by the retainer portion of said body while said engagement member is in engagement with the outer periphery of one of the grooves, to prevent said corrugated pipe from coming off.

2. A coupling as claimed in claim 1, in which the end of the receiving portion of said support member on the inlet port side is located generally at the ridges of said corrugated pipe while the distal end of said corrugated pipe pushes said support member.

3. A coupling as claimed in claim 1, in which an annular projection extending radially outwardly is formed on the end of the receiving portion on the inlet port side.

4. A coupling as claimed in claim 1, in which the retainer portion of the through-hole includes a tapered retainer surface which is gradually reduced in diameter toward the inlet port.

5. A coupling as claimed in claim 1, in which the accommodation recess and the retainer portion are spaced apart from each other, an inner periphery of the through-hole situated between the accommodation recess and the retainer portion being served as a holder portion, said holder portion accommodating said engagement member engaged in the grooves of said corrugated pipe to thereby prevent said engagement member from becoming enlarged in diameter.

6. A coupling as claimed in claim 1, in which an inner periphery of the through-hole includes a guide portion, said guide portion being located opposite to the inlet port with respect to the accommodation recess, and said support member has a base portion contacting an inner periphery of the guide portion.

7. A coupling as claimed in claim 6, in which an outer diameter of the receiving portion of said support member is smaller than the base portion and a step is formed between the receiving portion and the base portion, said support member being positioned by the step abutting against a side surface of the accommodation recess on the inlet side through said engagement member.

8. A coupling as claimed in claim 6, in which said support member has an annular abutment portion, the abutment portion being contacted with an entire periphery of the distal end of said corrugated pipe.

9. A coupling as claimed in claim 8, in which said body, spring, support member and corrugated pipe are formed of metal.

10. A coupling as claimed in claim 8, in which the abutment portion of said support member has a tapered surface against which a tapered surface of the distal end of said corrugated pipe is brought into abutment.

11. A coupling as claimed in claim 8, in which a flexible coating layer is formed on that surface of the abutment portion of said support member against which the distal end of said corrugated pipe is brought into abutment.

12. A coupling as claimed in claim 11, further comprising a spring seat of resin interposed between said spring and support member, a frictional resistance between the abutment portion of said support member and said corrugated pipe being larger than the sum of a frictional resistance between said support member and said guide portion and a frictional resistance between said support member and said spring.

13. A coupling as claimed in claim 8, in which the abutment portion of said support member has an elastically deformable annular plate spring.

14. A coupling as claimed in claim 8, in which the abutment portion of said support member has an annular elastic seal member, against which the distal end of said corrugated pipe is brought into abutment.

15. A coupling as claimed in claim 1, in which said spring includes a coil spring, said support member comprising a step formed on an inner periphery of an intermediate portion thereof and an annular projection projecting radially inwardly from a part thereof situated on an opposite side to the inlet port from this step, a turn of an end of said coil spring being supported between the projection and the step.

16. A coupling as claimed in claim 1, in which the through-hole of said body has a second annular accommodation portion situated away from the accommodation portion adapted to accommodate said engagement member toward the inlet portion, an annular seal member formed of an elastic material being accommodated in the second annular accommodation portion, a plurality of annular projections being axially spacedly formed on an outer periphery of this seal member.

17. A coupling as claimed in claim 16, in which, if a distance between the adjacent projections is represented by D and a pitch between the adjacent ridges of said corrugated pipe, by P, they have the following relation;

$$nD \neq mP$$

wherein "n" is an integer equal to or smaller than a number obtained by subtracting 1 from the number of the projections and "m" is equal to or smaller than a number obtained by subtracting 1 from a maximum value of the number of the ridges situated on the seal member when said corrugated pipe passes through the seal member.

18. A coupling as claimed in claim 1, in which said engagement member is formed of a coil spring which is curved in an annular shape in a natural state thereof, this coil spring, when attached to the outer periphery of the receiving portion of said support member and when engaged in the grooves of said corrugated pipe, being elastically enlarged in diameter with both ends thereof kept separated.

19. A coupling as claimed in claim 1, in which said engagement member has a partly cutout elastic ring and a coil spring surrounding this elastic ring with both ends thereof connected with each other.

20. A coupling as claimed in claim 1, wherein said body has a first and second cylinder threadedly engaged with each other;
    wherein the first cylinder has a threaded portion formed on an inner periphery of one end thereof and a first step formed on the inner periphery between said threaded portion and the other end;
    wherein the second cylinder has a second step formed on an outer periphery of an intermediate portion thereof and a threaded portion formed between said second step and one end thereof and adapted to engage with the threaded portion of the first cylinder; and wherein said accommodation recess is defined by said first step of the first cylinder and one end face of the second cylinder; and wherein the one end face of the first cylinder and the second step of the second cylinder are spaced apart by a distance equal to or smaller than a cross sectional diameter of said engagement member when the first and second cylinders are in threaded engagement with each other so that the first step of the first cylinder and the end face of the second cylinder is separated by a distance equal to the cross-sectional diameter of said engagement member.

* * * * *